June 15, 1965   J. W. NORTH   3,189,337
AMORPHOUS SILICA REFRACTORY STRUCTURES
Filed Sept. 7, 1960
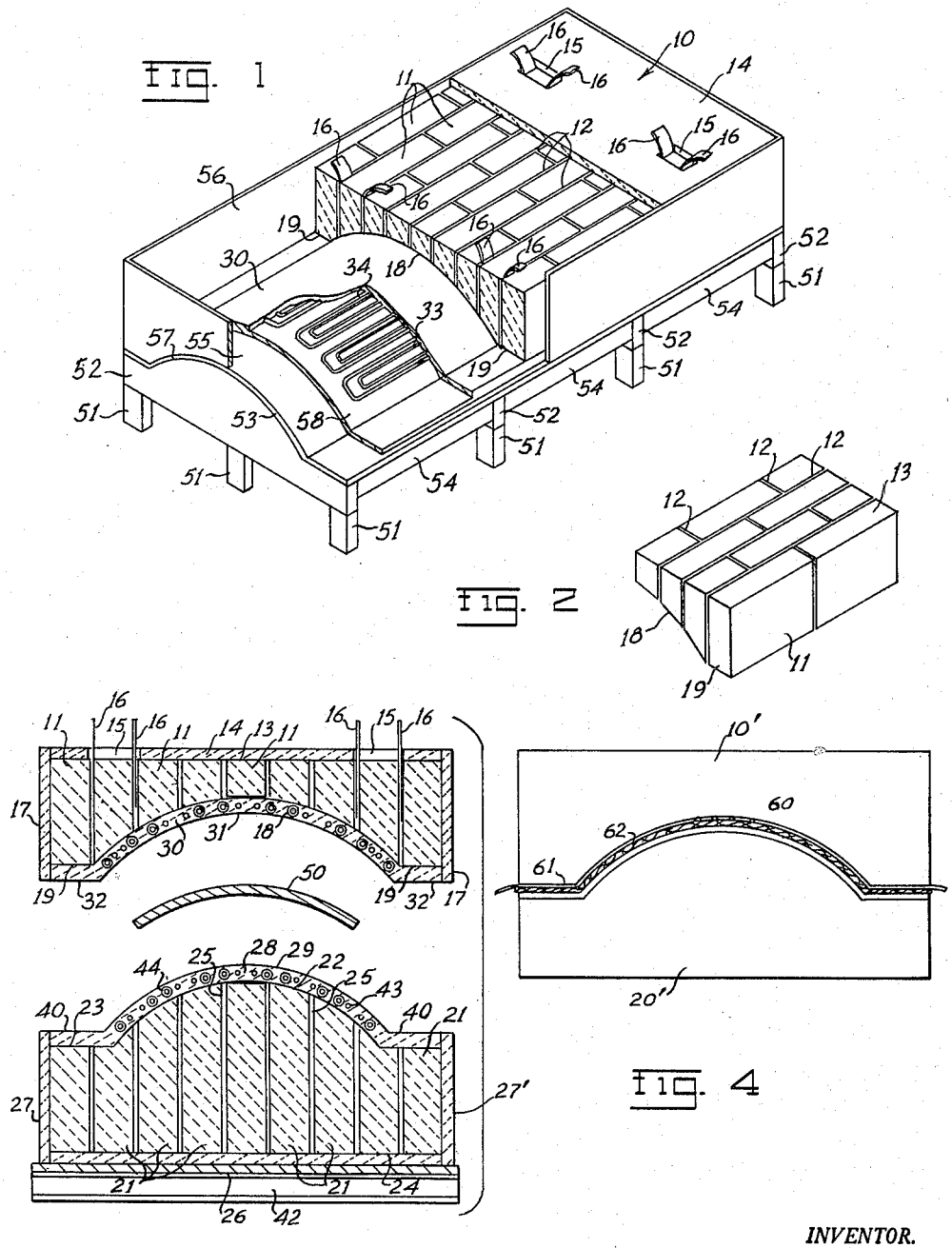
INVENTOR.
John W. North
BY
ATTORNEY 3,189,337
AMORPHOUS SILICA REFRACTORY STRUCTURES
John W. North, Atlanta, Ga., assignor to Glasrock Products, Inc., Atlanta, Ga., a corporation of Georgia
Filed Sept. 7, 1960, Ser. No. 54,537
3 Claims. (Cl. 266—2.5)

This invention relates to amorphous silica refractory structures and is more particularly concerned with a high temperature fixture for holding high temperature metals, the process of utilizing the fixture and the refractory materials employed therein.

With the advent of high velocity aircraft and missiles, a need has become more acute for a refractory structure which is substantial in size and will withstand extreme temperatures for extended periods of time without substantial variation in dimensions. It has been reported that the air frame of future aircraft will no longer be made of aluminum. This results from the fact that supersonic aircraft which will fly at speeds in the Mach 2 to Mach 4 range will develop temperatures of between 300° F. and 1000° F. on their leading edges. Generally speaking, air frames formed of aluminum will not withstand temperatures in excess of about 500° F. The construction of supersonic aircraft that will withstand these temperatures, however, presents quite a problem. The transition from subsonic aircraft to supersonic aircraft has been so rapid that development of materials and structural designs have not kept pace with the advances in engines and aerodynamics.

At the present time a metal that is being considered as a structural material for aircraft is high strength, heat treatable stainless steel, such as 420. Although such a material offers a solution to the areodynamic heating problem, the actual fabrication of an aircraft from such material has presented numerous problems. For example, if steel is to be formed in an annealed state to the desired contour, it is warped when it is subsequently heat treated to attain desired structural properties. If it is first heat treated, it is then too brittle or hard to be formed into desired contours. However, if the stainless steel could be simultaneously heat treated and formed, this particular problem could be solved.

One method that has been considered for accomplishing simultaneous heat treatment and forming is the use of ceramics for the forming dies. However, if ceramics are used, severe thermal shock will be imposed on the ceramic by its being placed in a furnace say at 1700-1800° F. for the heat treating. Also, a long period of time would be required for the heat to penetrate the ceramic which is normally insulative.

Briefly, I have devised a refractory structure which is suitable for the simultaneous forming to a predetermined shape and the heat treating of high temperature metals, the structure being capable of forming and holding relatively large shapes at high temperatures over extended periods of time. The structure of the present invention includes a plurality of mold or die elements, each being substantially entirely formed of amorphous or fused silica of various densities. More particularly, each element includes a plurality of juxtaposed amorphous silica blocks, one surface of which is shaped to form the desired contour for retaining, in conjunction with other similar elements, the metal part to be treated. For holding the juxtaposed foamed amorphous silica blocks together, I have provided a unique cement, also consisting, in its dried state, essentially of amorphous silica.

The foamed amorphous silica block is produced by the mixing of a foaming agent with finely divided amorphous silica dispersed in water to form a slip, and the curing, in the foamed condition of this admixture.

The cement for holding the blocks together includes a heterogenous dispersion of various sized particles of amorphous silica, held together in a semi-fluid condition by colloidal silica. The cement also serves to form a facing for the contoured surfaces of the blocks, which surfaces may carry such heating and cooling coils as are desired.

Accordingly, it is an object of the present invention to provide a refractory structure for shaping high temperature metals wherein the high temperature metals are simultaneously formed into predetermined shape and heat treated during the forming operation.

Another object of the present invention is to provide a refractory structure for holding materials in a rigid condition during the heat cycling of the same.

Another object of the present invention is to provide a process of producing a ceramic block suitable for making, with other similar blocks, a refractory structure which will withstand substantial heat.

Another object of the present invention is to provide a refractory cement for holding ceramic bodies, such as blocks, together, the cement and blocks being suitable for forming the refractory structure of the present invention.

Another object of the present invention is to provide an inexpensive and efficient process of and structure for holding high temperature metals during the heat treating and forming of the same and subsequent cooling of such metals, said structure having dimensional stability over a large thermal gradient, resistance to thermal shock and is easy to fabricate into large contoured shapes.

Other objects, features, and advantages will become apparent from the following description when taken in conjunction with the accompanying drawings, wherein like characters of reference designate corresponding parts throughout the several views, and wherein:

FIG. 1 is a perspective view of the cope of the refractory structure of the present invention, the cope being formed on a master or frame and having framing therearound for holding it in position.

FIG. 2 is a perspective view of a portion of the refractory material employed in producing the cope of FIG. 1.

FIG. 3 is an exploded cross sectional view of the refractory structure constructed in accordance with the present invention, there being provided a sheet of high temperature metal between the cope and drag of the refractory structure.

FIG. 4 is an end view of a modified form of the refractory structure of the present invention.

Referring now in detail to the embodiment chosen for the purpose of illustrating the present invention, it being understood that in its broader aspects, the present invention is not limited to the specific details depicted in the drawings, numeral 10 denotes generally the cope or mold element of the refractory structure of the present invention. Numeral 20 denotes the general drag or other mold element of the refractory structure of the present invention. The cope 10 is a rectangular composite structure, the body of which includes a plurality of foamed amorphous silica, juxtaposed blocks 11 in alignment in rows longitudinally of the refractory structure. The blocks 11 of the respective rows are staggered transversely, the arrangement being such that the blocks 11 in the odd rows are in alignment with each other transversely and the blocks 11 of the even rows are also in alignment transversely; however, the ends of the odd blocks 11 are offset longitudinally with respect to the ends of the even blocks 11. This tends to reduce cracking and provides a stronger final structure.

For holding the blocks 11 together, cement 12 is provided between all the blocks 11, the cement 12 being a ceramic cement also formed of amorphous silica, as will be described hereinafter. As best seen in FIGS. 1 and 3, the amorphous silica cement also extends over substantially the entire flat upper surface 13 of the blocks 11, thereby forming an upper layer 14. Appropriate holes 15 are provided in the layer 14, and straps 16, which are embedded in the cement 12, project therethrough. Suitable sides 17, 17', as seen in FIG. 3, may be provided, if desired.

As best seen in FIGS. 1 and 3, the bottom surface of the inner blocks 11 is provided with a central contour 18 which, in the particular embodiment illustrated, is a concaved, curvilinear surface. The bottom surfaces of the side blocks 11, however, are essentially flat as at numeral 19.

Covering the entire bottom surface is a uniform coating of amorphous silica cement forming a bottom layer 30 with a contoured lower central surface 31 and flat outer surfaces 32.

Embedded in the lower layer 30 are a plurality of parallel longitudinally extending portions of a heating coil or element 33, preferably electric heating coils; however, the coils may in some applications be hollow conduits through which liquid is passed. It will be seen in FIG. 1 that the ends of the parallel portions of the heating coils are joined to provide a snake-like member having an inlet and outlet (not shown) appropriately connected to a source of heat, such as an electrical outlet.

Also embedded with the heating element 33 is a cooling element 34, having parallel portions extending longitudinally of the structure, the parallel portions being joined at their ends to provide a continuous element having an inlet and outlet (not shown). The cooling element 34 is preferably a conduit through which a coolant is circulated at an appropriate time.

The drag 20 is formed in a manner similar to the formation of the cope 10. As seen in FIG. 3, the drag includes a plurality of juxtaposed foamed amorphous silica blocks 21 formed into longitudinal rows, the blocks 21 of odd rows being aligned transversely with each other but being staggered with respect to the bricks of the even rows. The central body of the drag 20 thus far formed includes a convex curvilinear upper surface 22 with flat outer edge portions 23 and a flat bottom 24.

Amorphous silica cement 25 separates the adjacent blocks 21 and a uniform coating of the cement surrounds the outer surfaces of the assembled blocks 21, thereby providing a bottom layer 26, side layers 27, 27' and top layer 28. The top layer 28 has a contoured, convex, curved outer surface 29 and flat outer surfaces 40 which mate with the concaved surface 31 and outer surfaces 32 of the cope 10. The structure thus described is supported on a platform 42.

Heating element 43 and cooling element 44, which are similar to the heating element 33 and cooling element 34, are embedded in the top layer 28.

Preferably, the heating elements 33 and 43 and the cooling elements 34 and 44 are arranged adjacent the curved surfaces 29 and 31 with no heating or cooling elements outwardly thereof, as seen in FIG. 3.

In the manufacture of the mold elements such as cope 10 and drag 20, a "master" is produced over which the element is built. If the refractory structure is relatively small, a plaster of Paris master would be suitable; however, if a relatively large structure is required, wood or steel structures may become necessary.

In the present embodiment, I have illustrated a relatively large refractory structure which might be employed for shaping to proper camber and heat treating a wing section 50 of stainless steel. The mold structure might also be employed for brazing of two such wing sections together, there being provided a sheet of brazing material between the two sections.

In the present embodiment, I have provided a master which includes a wooden frame having legs 51 which rest upon a floor or other suitable support. The legs 51 support forming ribs 52 arranged transversely at spaced intervals. The forming ribs are provided with contoured upper edges 53 shaped generally in the final shape of the contoured portion of the mold element, such as surface 31. Runners 54 join the ribs 52 together as illustrated in FIG. 1.

Over the upper edges 53 of the ribs 52 there is provided a contoured pattern plate 55. Pattern plate 55 may be formed of metal, plywood or a plurality of wooden laths. When wooden laths or plywood is employed, a suitable coating such as wood filler should be used to fill up any cracks and this filler covered with a coating of lacquer to provide a smooth upper surface.

Next, a rectangular frame 56 of the same dimensions as the master is prepared, the frame 56 having a contoured lower edge 57 conforming to the shape of the upper surface of pattern plate 55.

When the mold element, such as cope 10, is to be formed, a parting agent is placed over the surface of plate 55. This parting agent may be a polyethylene sheet 58, or oil or silicone grease. Next, the heating and cooling elements, such as elements 33 and 34, are placed over the pattern plate 55 and the frame 56 is placed on the pattern plate 55 so as to surround the elements 33 and 34.

The amorphous silica cement for forming bottom layer 30 is then troweled in and around the elements 33 and 34 and lateral vibration applied to the cement, if necessary, to fill in the voids. Preferably, the cement is then allowed to dry about eight hours and the upper surface roughed up and the loose material on the upper surface removed. If it is desired to embed the elements 33 and 34 more deeply, a thin layer of cement is placed over the parting agent 58 and permitted to dry about three and one-half to four hours. Then the elements are installed and additional cement applied thereover.

The blocks 11 are preferably pre-assembled into sections, such as shown in FIG. 2, with the cement 12 being applied continuously so as to leave as few voids as possible. The foamed amorphous silica blocks 11 are of such texture that the blocks 11 may be cut with a power saw prior to assembly into the proper shape for forming the central contour 18. Preferably, the surface of blocks 11 should be thoroughly wetted each time cement is applied thereto.

If the cement has been permitted to dry to form layer 30, the upper surface of the layer 30 should be wetted with water and the block sections wetted. Thereafter, cement is applied to the bottom and side surfaces of the block sections and these sections placed in their proper position over layer 30.

Of course, it will be understood that it is not mandatory for the lower layer to dry before blocks 11 are applied. It is also not mandatory for the blocks to be assembled into sections. However, it is believed that a superior mold element is produced by such a procedure.

The lifting straps 16 are inserted either in the cement 11 of the sections or in the cement 12 placed between the various sections when they are assembled.

The blocks 11 or a section of blocks 11 are secured to the layer 30, after the cement has been applied to the lower surface of the block, by tapping or vibrating the block manually or with a mechanical vibrator.

Preferably the blocks 11 or the block sections are laid progressievly from end or edge to the other.

Thereafter, the cement is poured over the blocks and the upper surface smoothed. While the cement is wet, the straps should be lifted out sufficiently to be accessible. Further, the cement 12 should be continuous between all blocks 11.

Finally, the sides and end of the mold element are dressed by trowelling of the cement to form sides, such as sides 17, 17'.

The assembled mold element, such as cope 10, is then permitted to dry for about twenty-four hours and removed from its master and transported to a kiln. In the kiln, the mold element is heated to from about 120° F. to about 180° F. for about forty-eight hours and then fired at 1900° F.–2000° F. for about eight to ten hours in much the same manner of curing as the blocks 11, the procedure therefor being described hereinafter. The mold element may be cooled as rapidly as desired.

It will be obvious to those skilled in the art that other channels, such as channel 60 in FIG. 4, passing through the mold element or cut in the surface of layer 30 may be employed in place of the cooling coil 34. These channels 60 may, if desired, direct a fluid such as air, nitrogen or water directly onto a section, such as section 50.

In FIG. 4 it is seen that the present refractory structure is particularly suited for blanket brazing of materials. In FIG. 4 a cope 10' and drag 20' are illustrated, the cope 10' and drag 20' being essentially the same as cope 10 and drag 20 except that no heating and cooling elements are provided.

In using either of the embodiments heretofore described, the metal such as section 50 which is to be formed and say annealed or brazed at a given temperature is placed between cope 10 and drag 20 or cope 10' and drag 20'. It may be found desirable to place fibre glass fabric 61 on both sides of the section 50 to separate the section from the mold elements. In FIG. 4 it will be seen that a heating element such as an electrci blanket 62 may also be employed over (and under) the section, such as section 50. Then heat is applied sufficient to achieve the desired result through the heating elements and the metal is thereafter cooled by use of fluid fed through the cooling conduits or channels 34, 44 and 60. In use, substantially no change in dimensions of the refractory structure is encountered and thermal shock on the structure is not a problem.

AMORPHOUS SILICA CEMENT

The cement employed in producing the foregoing mold element is produced by mixing colloidal silica solution and a coarse fused silica grain which has a grain size of −50 to +100 mesh, with a slip which is a slurry produced of fused silica and water. In more detail, the slip includes 82½% by weight solids and 17½% by weight water. The solids comprise the following size distribution by weight:

| | Percent |
|---|---|
| Less than 44 microns in diameter (324 mesh) equivalent spherical diameter (measured by falling weight through liquid) | 95 |
| Less than 2 microns in diameter | 20 |
| Less than 200 mesh | 5 |

The percentage of solids greater than 44 microns (325 mesh) should be held between 2% and 8%, and the percentage of solids less than two microns should be held between 15% and 25%.

The particle distribution between about 44 microns in size and about 2 microns in size should follow about a straight line logarithmatic curve. For example, the distribution should be approximately as follows:

| Solids: | Percent |
|---|---|
| Less than about 44 microns | 95 |
| Less than about 22 microns | 80 |
| Less than about 10 microns | 60 |
| Less than about 4 microns | 40 |
| Less than about 2 microns | 20 |

In such a manner, maximum contact between the particles is achieved, and thus minimum expansion and contraction due to heat is achieved. Too many "fires" will cause cracking.

To produce the desired particle distribution for the solids in a slip, fused silica having a particle size of −4 to +20 mesh is loaded with water into a ball mill using a high density alumina ball, 1" to 2½" in diameter. The density of the mixture of solids and liquids in the mill should be between 1.810 and 1.824 grams per milliliter and preferably about 1.818 grams (82.5% solids). The mill is then run and the particle size sampled until proper size characteristics are observed. It will be obvious to those skilled in the art that other methods may be employed for obtaining the proper distribution of particles in the slip.

The colloidal silica employed may be obtained commercially. "Nalcoag 1030" produced by Nalco Chemical Co. of Chicago, Illinois; "Ludox LS" or "Ludox HS" produced by E. I. du Pont de Nemours and Co. of Wilmington, Delaware, may be used. I prefer to use "Ludox LS" which is a dispersion of about 30% colloidal silica in water.

The cement is produced by admixing thoroughly one part Ludox with four parts coarse grain fused silica of a grain size of −50 to +100 mesh. Low shrinkage and low crackage may be held by using as much coarse grain fused silica as practical. For very low shrinkage and crackage, I recommend using 50% a grain size of −4 to +20 mesh, 30% a grain size of −50 to +100 mesh and 20% the finer particles.

After the admixture has been produced add four parts slip and thoroughly mix. The resulting cement is thixotropic and therefore should be thoroughly mixed before using.

A dry cement may be produced by drying the wet slip and coarse grains and then regrinding the same sufficient to break up agglomeration. This does not change the particle size. The dry cement may later be used by first mixing 50% water and the 50% colloidal silica solution (30% silica and 70% water) together and thereafter adding sufficient dry mix to the watered silica solution to produce a cement.

FOAMED AMORPHOUS SILICA BLOCK

The foamed amorphous silica block employed as block 11 is produced by mixing the slip previously described with a foaming agent and then stabilizing with acid, casting the block and curing the same. The resulting block should have a density of about 25 to 60 pounds per cubic foot and preferably between 45 and 50 pounds per cubic foot. To produce a 45 pound per cubic foot block, 72 parts slip is mixed with one part foaming agent (hydrolized protein) utilizing a seven cubic foot per minute foam generator. The mixture is then stabilized with from 700 to 1000 cc. of 25% hydrochloric acid. The material is then cast and cured. A better understanding will be had by reference to the following example:

Example 1

In a ribbon type mixer 1800# of slip were thoroughly blended; then 25# of foam from a 7 cubic foot per minute generator were introduced into the slip. The generator was run for 140 seconds and the foam was mixed with the slip for 10 minutes. The foaming agent employed was "Airfoam" produced by the American La France Co. of Elmira, New York. Next 850 cc. of hydrochloric acid (25% HCl) solution were added to the slip and foam in the mixer. The mixing was carried on at room temperature. The density of the stabilized mix was .9 gram/cc. The stabilized mix was then poured into several block shaped plaster of Paris molds and permitted to dry at room temperature for about twenty-four hours. The plaster molds were then removed and the green cast blocks placed in a kiln and dried at a slightly elevated temperature maintained between about 120° F. and 180° F. for forty-eight hours. Thereafter, the blocks were fired at a temperature of from 1900° F. to 2000° F. for ten hours. The blocks were then cooled and finished to size using an abrasive saw.

Usually in casting the blocks they should be slightly oversize so that about ⅛ inch of each surface may be removed to remove any cracks which might have developed.

Preferably the firing temperature should be from 1900° F. to 2000° F. since if the blocks are held at above 2050°

F. for an extended period, cracks and crevices develop. Below about 1800° F. to 1900° F. the resulting blocks would be soft and more fragile.

The resulting blocks produced according to the above process had the following physical characteristics:

Density gm./cc. _____ 0.5–0.9.
Linear coefficient
  of expansion _____ .54×10$^{-6}$° C., 0–1000° C.
Porosity _____ 50–60%.
Strength:
  Modulus of Rupture ____ 75–300 p.s.i.
  Compressive _____ 150–160 p.s.i.
Structure: Open cell, water and oil pass through.

In the above process, the more foam that is added, the less dense the resulting product will be. When the green blocks are fired, minute quantities of crystobolite is formed which acts to bond the material together. Both the block and the dried cured cement are capable of being heated to temperatures in the neighborhood of 1000° F. and being plunged into liquid nitrogen without cracking.

It will be understood that other foaming agents may be employed if desired. For example, "Elastizell" produced by Elastizell, Inc., of Decatur, Georgia, may be used if desired.

It will be obvious to those skilled in the art that many variations may be made in the embodiments chosen for the purpose of illustrating the present invention without departing from the scope thereof as defined by the appended claims.

I claim:
1. A refractory structure comprising a plurality of fused silica blocks cemented together with a fused silica cement, said cement being formed initially from grains of fused silica, water and colloidal silica, said block including grains of fused silica bonded together by minute quantities of crystobolite, said block being an open cell member with a density of from .5 to .9 gm./cc., the structure being capable of withstanding temperatures of 2000° F., said blocks forming a pair of mating mold elements, and layers of cement along the mating surfaces of said blocks.

2. A refractory structure comprising a plurality of fused silica blocks cemented together with a fused silica cement, said cement being formed initially from grains of fused silica, water and colloidal silica, said block including grains of fused silica bonded together by minute quantities of crystobolite, said block being an open cell member with a density of from .5 to .9 gm./cc., the structure being capable of withstanding temperatures of 2000° F., said blocks forming a pair of mating mold elements, layers of cement along the mating surfaces of said blocks, and elements in one of said layers for effecting a temperature change on sections placed between said mold elements.

3. A refractory structure comprising a plurality of fused silica blocks cemented together with a fused silica cement, said cement being formed initially from grains of fused silica, water and colloidal silica, said block including grains of fused silica bonded together by minute quantities of crystobolite, said block being an open cell member with a density of from .5 to .9 gm./cc., the structure being capable of withstanding temperatures of 2000° F., said blocks forming a pair of mating mold elements, layers of cement along the mating surfaces of said blocks, and heating elements embedded in said layers for heating and annealing metal placed between said mold elements.

References Cited by the Examiner
UNITED STATES PATENTS

| | | | |
|---|---|---|---|
| 627,443 | 6/99 | Ponton | 106—41 |
| 1,378,984 | 5/21 | Soss | 22—74 |
| 1,669,363 | 5/28 | Watson | 106—41 |
| 1,909,008 | 5/33 | Prange | 106—69 X |
| 2,122,288 | 6/38 | Knote | 25—156 |
| 2,152,190 | 3/39 | Henderson | 50—464 |
| 2,293,089 | 8/42 | Wainer | 50—464 |
| 2,364,317 | 12/44 | Schaefer | 25—156 |
| 2,462,517 | 2/49 | Leverenz | 23—277 X |
| 2,883,347 | 4/59 | Fisher et al. | 106—40 |
| 3,059,296 | 10/62 | North | 22—193 |

JOHN F. CAMPBELL, *Primary Examiner.*

JACOB L. NACKENOFF, JAMES H. TAYMAN, JR., MORRIS O. WOLK, *Examiners.*